United States Patent
Li

(10) Patent No.: US 12,228,910 B2
(45) Date of Patent: Feb. 18, 2025

(54) CONTROL METHOD, APPARATUS, SYSTEM, DEVICE AND MEDIUM FOR PRODUCTION EQUIPMENT

(71) Applicant: CHANGXIN MEMORY TECHNOLOGIES, INC., Hefei (CN)

(72) Inventor: Huan-Cheng Li, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 403 days.

(21) Appl. No.: 17/569,455

(22) Filed: Jan. 5, 2022

(65) Prior Publication Data

US 2022/0269244 A1 Aug. 25, 2022

Related U.S. Application Data

(63) Continuation of application No. PCT/CN2021/111464, filed on Aug. 9, 2021.

(30) Foreign Application Priority Data

Feb. 23, 2021 (CN) .......................... 202110200922.7

(51) Int. Cl.
*G05B 19/4155* (2006.01)

(52) U.S. Cl.
CPC .............. *G05B 19/4155* (2013.01); *G05B 2219/45031* (2013.01)

(58) Field of Classification Search
None
See application file for complete search history.

(56) References Cited

U.S. PATENT DOCUMENTS

| | | | |
|---|---|---|---|
| 6,000,830 A * | 12/1999 | Asano | G05B 19/41855 700/121 |
| 8,612,042 B2 | 12/2013 | Pettus et al. | |
| 2002/0183950 A1* | 12/2002 | Fu | G06F 40/194 702/84 |
| 2003/0229411 A1* | 12/2003 | Shen | G06Q 99/00 700/121 |
| 2012/0254885 A1* | 10/2012 | Cai | G06F 9/5016 718/104 |

(Continued)

FOREIGN PATENT DOCUMENTS

| | | |
|---|---|---|
| CN | 105469175 A | 4/2016 |
| CN | 106959674 A | 7/2017 |
| CN | 108134635 A | 6/2018 |

(Continued)

*Primary Examiner* — David Earl Ogg
(74) *Attorney, Agent, or Firm* — Kilpatrick Townsend & Stockton LLP

(57) ABSTRACT

Embodiments relate to a control method, apparatus, system, device and medium for production equipment. The method includes: receiving a recipe upload instruction, and generating a first control instruction in response to the recipe upload instruction to control the production equipment to upload first recipe data; receiving the first recipe data, and parsing the first recipe data to generate a corresponding first recipe file in a preset format; generating a second control instruction during parsing the first recipe data to control the production equipment to upload second recipe data; and receiving the second recipe data, and parsing the second recipe data to generate a corresponding second recipe file in a preset format.

9 Claims, 7 Drawing Sheets

(56) References Cited

U.S. PATENT DOCUMENTS

2013/0253684 A1* 9/2013 Rudnick .............. G05B 19/056
                                                                700/106

FOREIGN PATENT DOCUMENTS

| CN | 110412947 | A | | 11/2019 | |
|----|-----------|---|---|---------|---|
| CN | 111783172 | A | | 10/2020 | |
| CN | 112286154 | A | | 1/2021 | |
| TW | 201116956 | A | * | 5/2011 | |
| WO | WO-2014101561 | A1 | * | 7/2014 | ........... G06F 9/3851 |

* cited by examiner

CONTROL METHOD, APPARATUS, SYSTEM, DEVICE AND MEDIUM FOR PRODUCTION EQUIPMENT

CROSS-REFERENCE TO RELATED APPLICATION

This application is a continuation of PCT/CN2021/111464, filed on Aug. 9, 2021, which claims priority to Chinese Patent Application No. 2021102009227 titled "CONTROL METHOD, APPARATUS, SYSTEM, DEVICE AND MEDIUM FOR PRODUCTION EQUIPMENT" and filed to the State Intellectual Property Office on Feb. 23, 2021, the entire contents of which are incorporated herein by reference.

TECHNICAL FIELD

The present disclosure relates to the field of automatic control technology, and more particularly, to a control method, apparatus, system, device and medium for production equipment.

BACKGROUND

With the rapid development of equipment production technologies and the continuous improvement of automation levels, intelligent control of equipment automation operation between control devices in a production plant and between the control devices and controlled device is generally implemented by means of program instructions.

In an automatic semiconductor production control system, generally batch control of a plurality of semiconductor production equipment is implemented by means of equipment automation program (EAP). The EAP obtains a recipe upload request from a recipe management system (RMS) by means of a tool control system (TCS), and sends the recipe upload request to the plurality of semiconductor production equipment communicatively interconnected with the EAP, such that the plurality of semiconductor production equipment upload recipe data to the EAP. Generally, the EAP cannot feed back an execution result of the recipe upload request to the RMS unless the recipe data of all the semiconductor production equipment communicatively interconnected with the EAP are obtained, which leads to larger number of batch-controlled semiconductor production equipment, and longer time spent in execution of the recipe upload request. However, production cannot be started until the recipe data are checked, which causes the semiconductor production equipment to be idle, and thus wastes production capacity of the semiconductor production equipment.

Therefore, how to reduce equipment idle time caused by sequential execution of control instructions by the plurality of production equipment in the process of equipment batch control becomes one of technical problems to be solved urgently in the process of further improving production efficiency of the automatic production line.

SUMMARY

Various embodiments of the present disclosure provide a control method, apparatus, system, device and medium for production equipment.

A first aspect of the present disclosure provides a control method for production equipment, the method comprising:

receiving a recipe upload instruction, and generating a first control instruction in response to the recipe upload instruction to control the production equipment to upload first recipe data;

receiving the first recipe data, and parsing the first recipe data to generate a corresponding first recipe file in a preset format;

generating a second control instruction during parsing the first recipe data to control the production equipment to upload second recipe data; and receiving the second recipe data, and parsing the second recipe data to generate a corresponding second recipe file in a preset format.

A second aspect of the present disclosure provides a control method for production equipment, the method comprising:

receiving a recipe upload trigger instruction sent by a recipe management system, and generating a recipe upload instruction in response to the recipe upload trigger instruction, the recipe upload instruction being configured for commanding an equipment automation program to receive the recipe data uploaded by the production equipment and parse the recipe data in parallel to generate recipe result data, the recipe data comprising first recipe data and second recipe data;

receiving the recipe result data sent by the equipment automation program;

generating a recipe result file package based on the recipe result data; and sending the recipe result file package to the recipe management system.

A third aspect of the present disclosure provides a control method for production equipment, the method comprising:

sending a recipe upload trigger instruction to cause a control system for production equipment to receive the recipe upload trigger instruction and generate a recipe upload instruction based on the recipe upload trigger instruction, the recipe upload instruction being configured for causing an equipment automation program to implement the control method for production equipment applied to the equipment automation program as described in any embodiment of the present disclosure; and receiving a recipe result file package.

A fourth aspect of the present disclosure provides a control apparatus for production equipment. The apparatus comprises an instruction receiving unit, a control unit, a data receiving unit, and a data parsing unit. The instruction receiving unit is configured to receive an recipe upload instruction. The control unit is connected to the instruction receiving unit and is configured to generate a first control instruction and a second control instruction in response to the recipe upload instruction received, wherein the first control instruction is configured for controlling the production equipment to upload first recipe data, and the second control instruction is configured for controlling the production equipment to upload second recipe data. The data receiving unit is connected to the control unit and is configured to receive the first recipe data and the second recipe data. The data parsing unit is connected to the data receiving unit, and is configured to parse the received first recipe data to generate a corresponding first recipe file in a preset format. The data parsing unit is further configured to parse the received second recipe data to generate a corresponding second recipe file in a preset format.

A fifth aspect of the present disclosure provides a control system for production equipment. The control system comprises: an equipment automation program, a control system for production equipment, and a recipe management system. The equipment automation program is configured for implementing the control method for production equipment applied to the equipment automation program as described in any embodiment of the present disclosure. The control method for production equipment applied to the control system for production equipment as described in any embodiment of the present disclosure is applied to the control system for production equipment. The control method for production equipment applied to the recipe management system as described in any embodiment of the present disclosure is applied to the recipe management system.

A sixth aspect of the present disclosure provides a computer device, comprising a memory and a processor. The memory has stored thereon a computer program runnable on the processor. The computer program is executable by the processor, whereby steps of the method described in any embodiment of the present disclosure are performed.

A seventh aspect of the present disclosure provides a computer-readable storage medium having a computer program stored thereon, wherein the computer program is executable by a processor, whereby steps of the method described in any embodiment of the present disclosure are performed.

BRIEF DESCRIPTION OF THE DRAWINGS

To describe the technical solutions of the embodiments of the present disclosure more clearly, the accompanying drawings required for describing the embodiments will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

For ease of understanding the present disclosure, the present disclosure will be described more fully hereinafter with reference to the accompanying drawings. Some embodiments of the present disclosure are provided in the accompanying drawings. The present disclosure may, however, be embodied in many different forms and should not be limited to the embodiments set forth herein. Rather, these embodiments are provided so that disclosed contents of the present disclosure will be understood more thoroughly and completely.

Unless otherwise defined, all technical and scientific terms employed herein have the same meaning as commonly understood by one of ordinary skill in the art to which the present disclosure belongs. The terms employed in the specification of the present disclosure are merely for the purpose of describing some embodiments and are not intended for limiting the present disclosure. As used herein, the term "and/or" includes any and all combinations of one or more of the associated listed items.

In the case of "comprising", "having", and "including" as described herein, another component may be added unless a clearly defined term is used, such as "only", "consisting of", etc. Unless mentioned to the contrary, terms in the singular form may include the plural form and cannot be understood as one in number.

It should be understood that although terms such as "first", "second" and the like may be used herein to describe various components, these components should not be limited by these terms. These terms are only intended to distinguish one component from another one. For example, a first component may be termed a second component, and similarly, a second component may be termed a first component, without departing from the scope of the present disclosure.

In the description of the present disclosure, it is to be noted that unless specified or limited otherwise, terms "installation", "connecting" or "connection" should be understood in a broad sense, which may be, for example, a fixed connection, a detachable connection or integrated connection, a direct connection or indirect connection by means of an intermediary, or internal communication between two components. For those of ordinary skill in the art, meanings of the above terms in the present disclosure may be understood based on circumstances.

Figure 1:
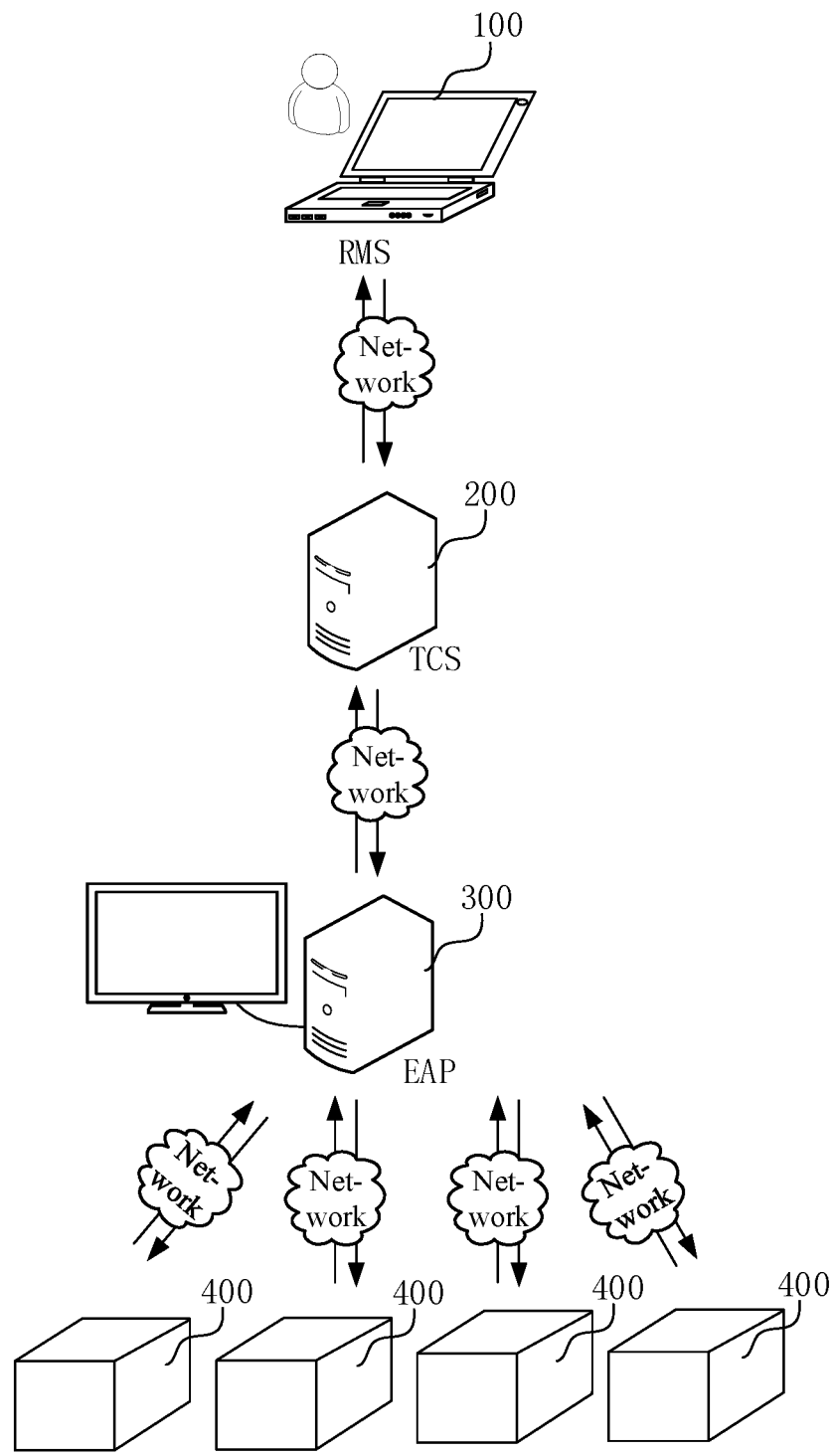
FIG. 1 is a schematic diagram of an application scenario of a control method for production equipment according to the present disclosure.

Referring to FIG. 1, an implementation principle of the present disclosure is exemplarily described by taking a control system for semiconductor automatic production equipment as an example. In an automatic semiconductor production line, a plurality of automatic semiconductor production equipment 400 may sequentially upload recipe data to an equipment automation program (EAP) 300 based on a recipe upload request received from the EAP 300 of the semiconductor production equipment. The recipe upload request may be set to include number of recipe data required to be uploaded, such that the EAP can obtain the recipe data uploaded sequentially by the plurality of semiconductor production equipment by sending the recipe upload request. The EAP 300 may establish communication interconnection with a recipe management system (RMS) 100 by means of a tool control system (TCS) 200, and the EAP 300 may obtain the recipe upload request from the RMS 100 by means of the TCS 200. After receiving the recipe data uploaded by the semiconductor production equipment, the EAP parses the recipe data. Obviously, if the EAP is set to parse the recipe data uploaded by each of the plurality of semiconductor production equipment in sequence, this may easily lead to longer time spent in parsing the recipe data when number of the semiconductor production equipment controlled by the EAP is larger, which causes the semiconductor production equipment to be idle, and thus wastes production capacity of the semiconductor production equipment. Therefore, to reduce equipment idle time caused by sequential execution of control instructions by the plurality of production equipment in the process of equipment batch control, and to improve production efficiency of the automatic production line, the present disclosure provides technical solutions described in the following embodiments.

Figure 2:
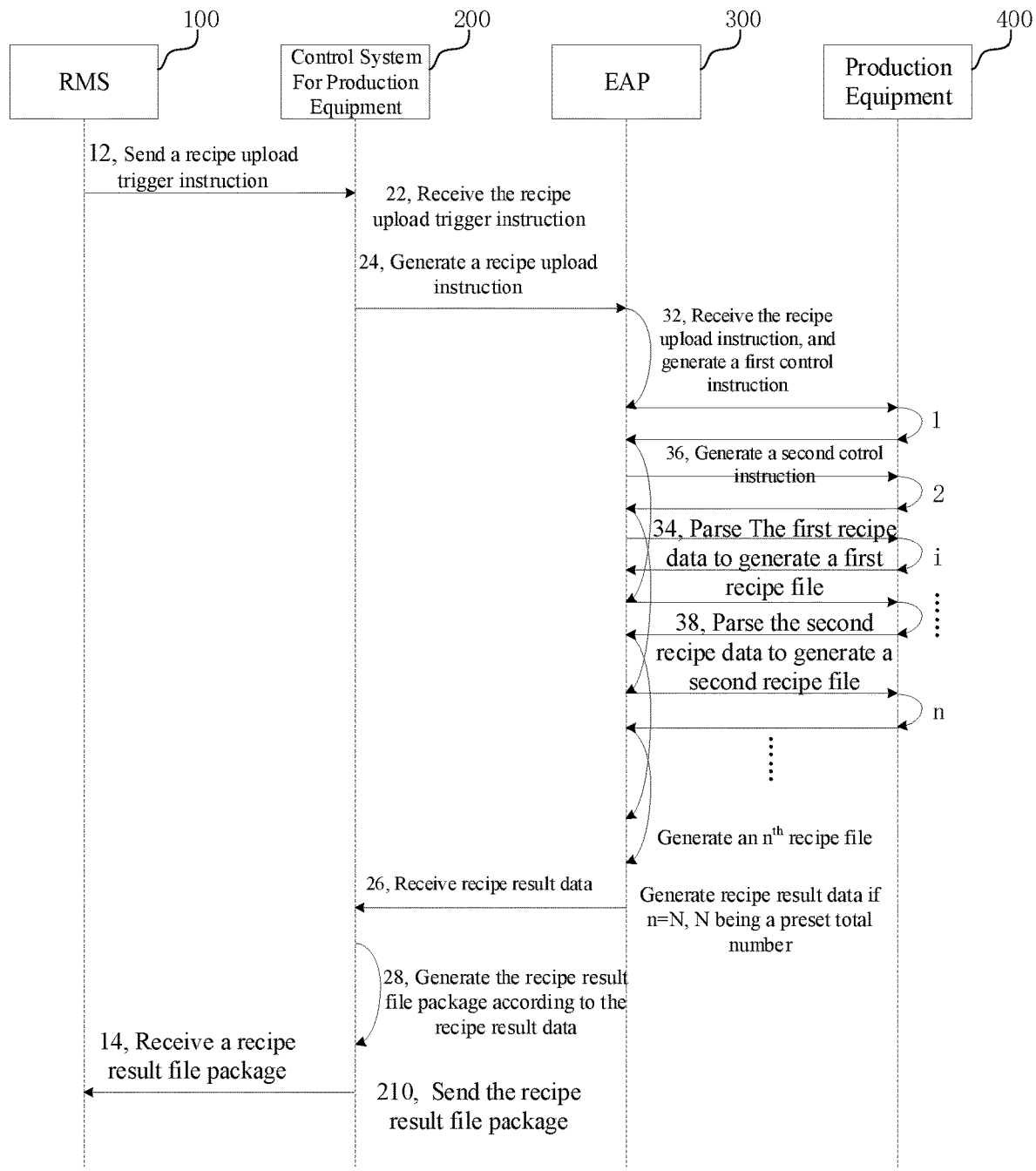
FIG. 2 is a schematic diagram of an application flow of a control method for production equipment according to an embodiment of the present disclosure.
Figure 3:
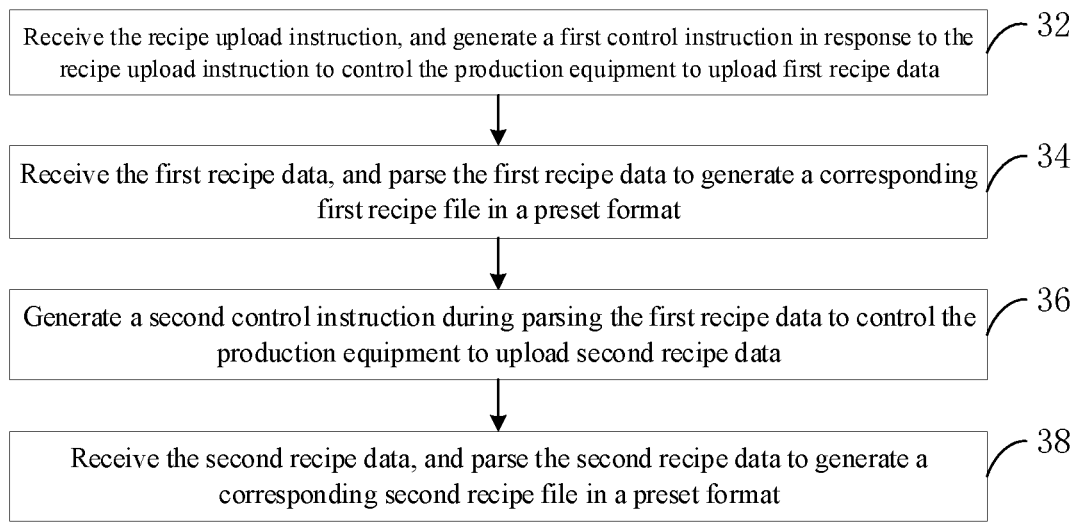
FIG. 3 is a schematic flow diagram of a control method for production equipment applied to an equipment automation program according to an embodiment of the present disclosure.

Referring to FIG. 2 and FIG. 3, in one embodiment of the present disclosure, a control method for production equipment is provided. The control method may be applied to the EAP 300 as shown in FIG. 2, and the method comprises following steps:

Step 32: receiving a recipe upload instruction, and generating a first control instruction in response to the recipe upload instruction to control the production equipment to upload first recipe data;

Step 34: receiving the first recipe data, and parsing the first recipe data to generate a corresponding first recipe file in a preset format;

Step 36: generating a second control instruction during parsing the first recipe data to control the production equipment to upload second recipe data; and Step 38: receiving the second recipe data, and parsing the second recipe data to generate a corresponding second recipe file in a preset format.

In some embodiments, with continued reference to FIG. 2 and FIG. 3, a recipe upload instruction may be received by setting the EAP 300, and a first control instruction is generated based on the recipe upload instruction to control production equipment 400 to upload first recipe data 1, such that the EAP 300 parses the received first recipe data 1 to generate a corresponding first recipe file in a preset format. During parsing the first recipe data by setting the EAP 300, a second control instruction is generates to control the production equipment 400 to upload second recipe data 2, such that the EAP 300 parses the received second recipe data 2 in parallel to generate a corresponding second recipe file in a preset format, thereby reducing time delay caused in the process of parsing the first recipe data 1 by the EAP 300. During parsing the second recipe data 2 by the EAP 300, the first control instruction is regenerated to repeat the preceding steps until all the production equipment 400 communicatively interconnected with the EAP 300 have uploaded the corresponding recipe data to the EAP 300. For example, if the total number of the production equipment 400 communicatively interconnected with the EAP 300 is N, after obtaining N recipe data, the EAP 300 stops generating control instructions configured for controlling the production equipment 400 to upload the recipe data. Compared with the conventional EAP 300 that does not start parsing the second recipe data until parsing the first recipe data is completed, the EAP 300 provided in the present disclosure parses the second recipe data in parallel while parsing the first recipe data, such that time required for parsing the recipe data is shortened. In this way, equipment idle time caused by sequential execution of control instructions by the plurality of production equipment in the process of equipment batch control is effectively reduced, and the production capacity of the production equipment and the production efficiency of the automatic production line are improved.

As an example, in one embodiment of the present disclosure, there is provided a control method for production equipment, which may be applied to the EAP 300 as shown in FIG. 2. The parsing the first recipe data to generate a corresponding first recipe file in a preset format comprises:

Step 342: parsing the first recipe data by invoking a first thread to generate the corresponding first recipe file in the preset format.

In some embodiments, the first recipe data are parsed by invoking the first thread, and the corresponding first recipe file in the preset format is generated. In this way, independent parsing of the first recipe data is implemented, such that the EAP 300 parses the second recipe data in parallel while parsing the first recipe data, thereby shortening time required for parsing the recipe data.

As an example, in one embodiment of the present disclosure, there is provided a control method for production equipment, which may be applied to the EAP 300 as shown in FIG. 2. The parsing the second recipe data to generate a corresponding second recipe file in a preset format comprises:

Step 382: parsing the second recipe data by invoking a second thread to generate the corresponding second recipe file in the preset format.

In some embodiments, the second recipe data are parsed by invoking the second thread, and the corresponding second recipe file in the preset format is generated. In this way, independent parsing of the second recipe data is implemented, such that the EAP 300 parses the second recipe data in parallel while parsing the first recipe data, thereby shortening the time required for parsing the recipe data.

Figure 4:
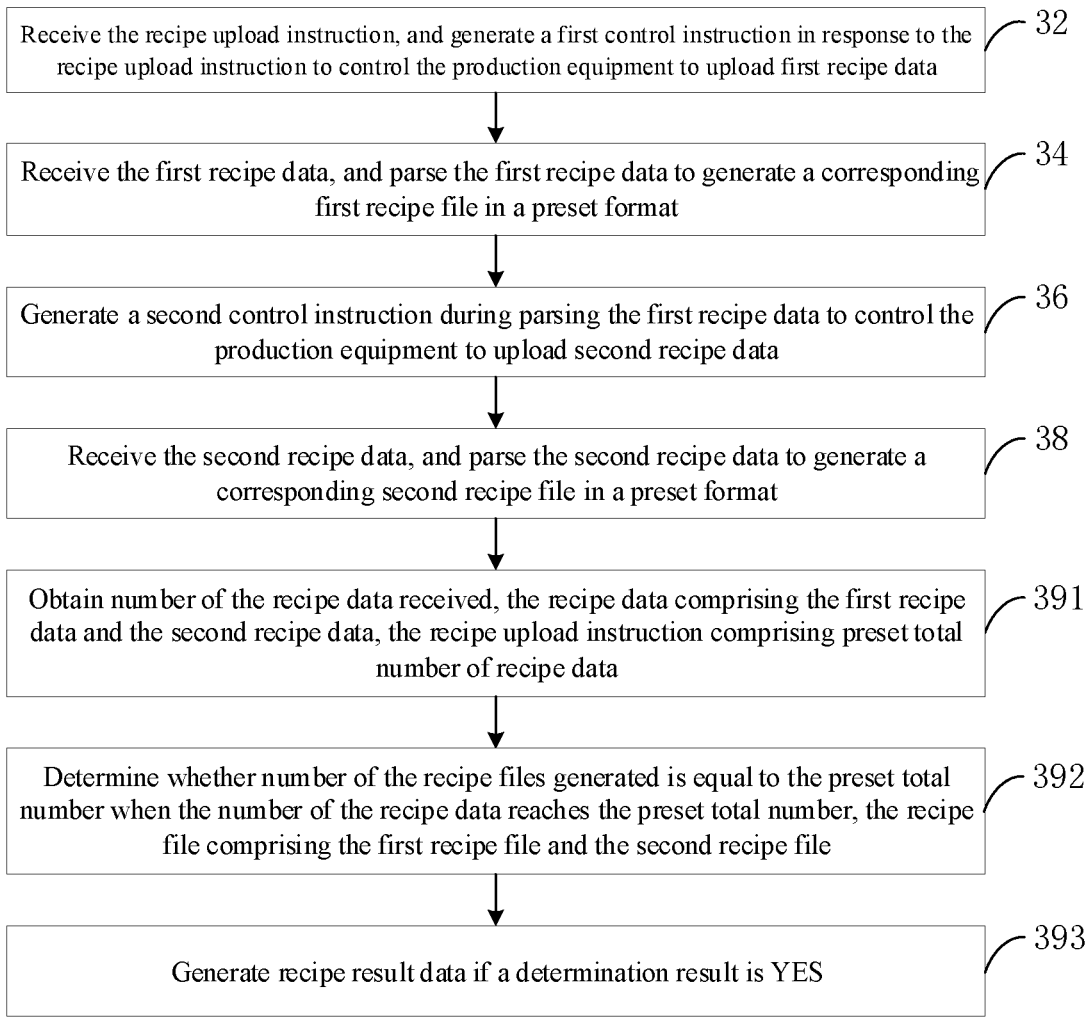
FIG. 4 is a schematic flow diagram of a control method for production equipment applied to an equipment automation program according to another embodiment of the present disclosure.

Further, referring to FIG. 2 and FIG. 4, in one embodiment of the present disclosure, a control method for production equipment is provided. The control method may be applied to the EAP 300 as shown in FIG. 2, and the method comprises following steps:

Step 391: obtaining number of the recipe data received, the recipe data comprising the first recipe data and the second recipe data, the recipe upload instruction comprising preset total number of recipe data;

Step 392: determining whether number of the recipe files generated is equal to the preset total number when the number of the recipe data reaches the preset total number, the recipe file comprising the first recipe file and the second recipe file; and Step 393: generating recipe result data if a determination result is YES.

In some embodiments, with continued reference to FIG. 2 and FIG. 4, the recipe upload instruction comprises the preset total number of recipe data, and it is determined whether sum of the number of the first recipe data and the number of the second recipe data reaches the preset total number, to determine whether the EAP 300 receives the recipe data uploaded by all the production equipment 400 communicatively interconnected with the EAP 300. After the EAP 300 receives the recipe data uploaded by all the production equipment 400 communicatively interconnected with the EAP 300, it is determined whether the sum of the number of the first recipe files generated and the number of the second recipe files reaches the preset total number. If the determination result is YES, it means that the EAP 300 has parsed the received recipe data, and the EAP 300 generates recipe result data, to feed back execution result information on the recipe upload instruction to a higher-level control apparatus such as the control system 200 for production equipment based on the recipe result data.

Figure 5:
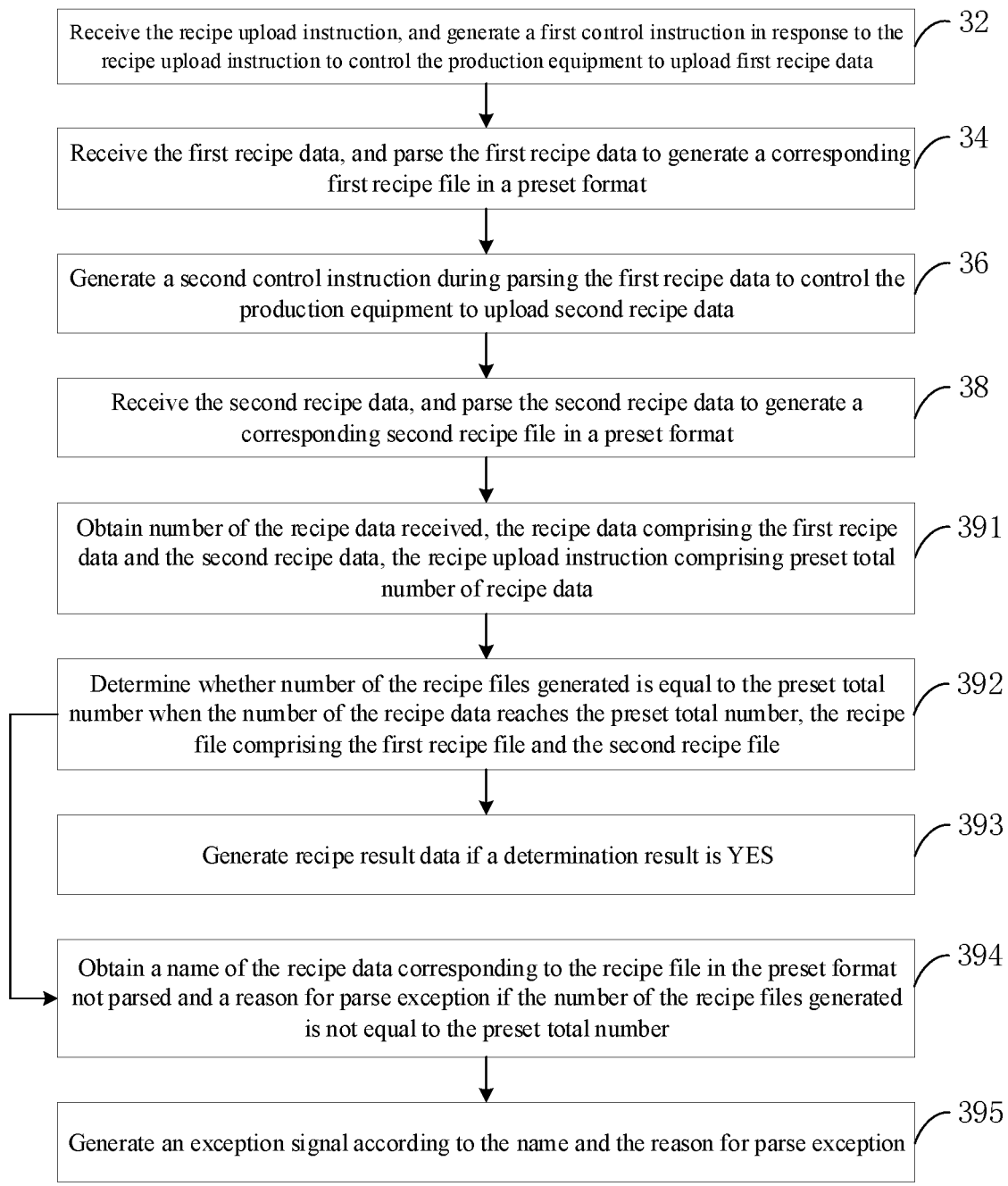
FIG. 5 is a schematic flow diagram of a control method for production equipment applied to an equipment automation program according to still another embodiment of the present disclosure.

Further, referring to FIG. 2 and FIG. 5, in one embodiment of the present disclosure, a control method for production equipment is provided. The control method may be applied to the EAP 300 as shown in FIG. 2, and the method also comprises following steps:

Step 394: obtaining a name of the recipe data corresponding to the recipe file in the preset format not parsed and a reason for parse exception if the number of the recipe files generated is not equal to the preset total number; and Step 395: generating an exception signal according to the name and the reason for parse exception.

In some embodiments, with continued reference to FIG. 2 and FIG. 5, if it is detected that the number of generated recipe files is different from the preset total number, for example, if the number n of the generated recipe files is less than the preset total number N, this indicates that an exception occurs in the process of parsing the recipe data by the EAP. In this case, a name of the recipe data corresponding to the recipe file in the preset format not parsed and a reason for parse exception are obtained, and an exception signal is generated according to the name and the reason for parse exception, such that the EAP 300 feeds back, based on the exception signal, the name of the recipe data corresponding to the recipe file in the preset format not parsed and the reason for parse exception to a higher-level control apparatus such as the control system 200 for production equipment.

As an example, in one embodiment of the present disclosure, the production equipment is semiconductor production equipment, and the recipe data are semiconductor recipe data. This embodiment effectively reduces the equipment idle time caused by sequential execution of control instructions by the semiconductor production equipment in the process of batch control of the semiconductor production equipment, and improves the production capacity of the semiconductor production equipment and the production efficiency of the automatic production line.

Figure 6:
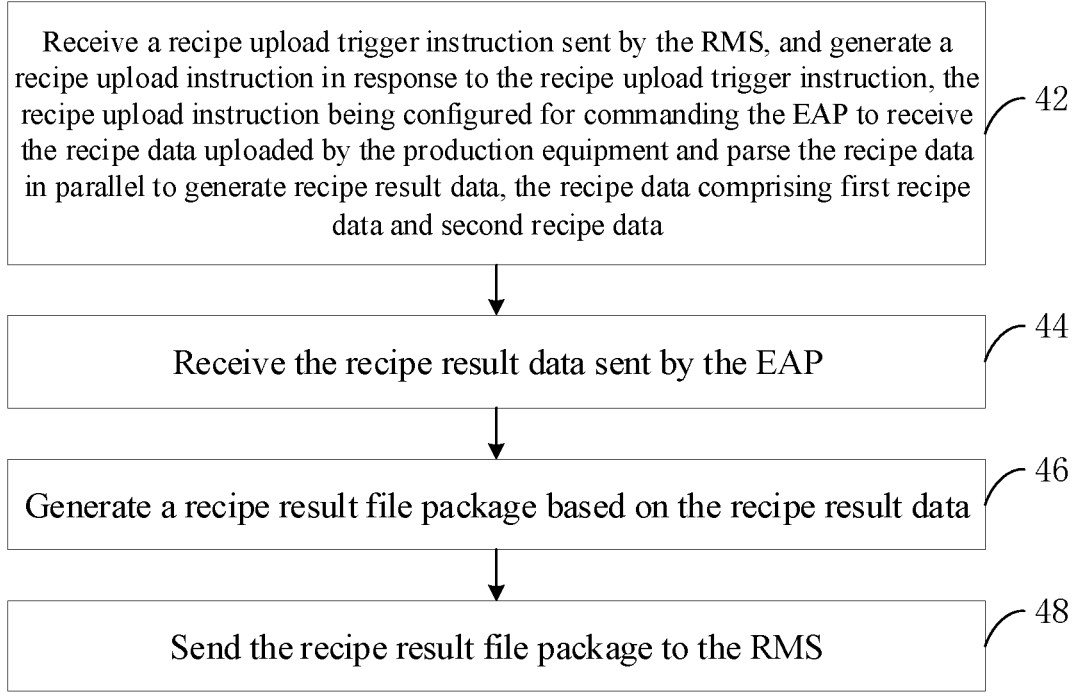
FIG. 6 is a schematic flow diagram of a control method for production equipment applied to a control system for production equipment according to an embodiment of the present disclosure.

Further, referring to FIG. 2 and FIG. 6, in one embodiment of the present disclosure, a control method for production equipment is provided. The control method may be applied to a control system 200 for production equipment as shown in FIG. 2, and the method also comprises following steps:

Step 42: receiving a recipe upload trigger instruction sent by the RMS, and generating a recipe upload instruction in response to the recipe upload trigger instruction, the recipe upload instruction being configured for commanding the EAP to receive the recipe data uploaded by the production equipment and parse the recipe data in parallel to generate recipe result data, the recipe data comprising first recipe data and second recipe data;

Step 44: receiving the recipe result data sent by the EAP;

Step 46: generating a recipe result file package based on the recipe result data; and Step 48: sending the recipe result file package to the RMS.

In some embodiments, with continued reference to FIG. 6, the control system 200 for production equipment may generate a recipe upload instruction based on the recipe upload trigger instruction received from the RMS 100. The recipe upload instruction is configured for commanding the EAP 300 to receive the recipe data uploaded by the production equipment 400 and parse the first recipe data and the second recipe data in parallel to generate recipe result data, thereby avoiding time delay caused in the process of parsing the first recipe data by the EAP 300. The control system 200 for production equipment may receive the recipe result data sent by the EAP 300, generate a recipe result file package based on the recipe result data, and send the recipe result file package to the RMS 100. In this way, automatic control of the control system 200 for production equipment, the EAP 300 and the production equipment 400 may be implemented in sequence by means of the RMS 100. In this embodiment, time required for parsing the recipe data is shortened, which effectively reduces the equipment idle time caused by sequential execution of control instructions by the plurality of production equipment in the process of equipment batch control, such that the production capacity of the production equipment and the production efficiency of the automatic production line are improved.

Figure 7:
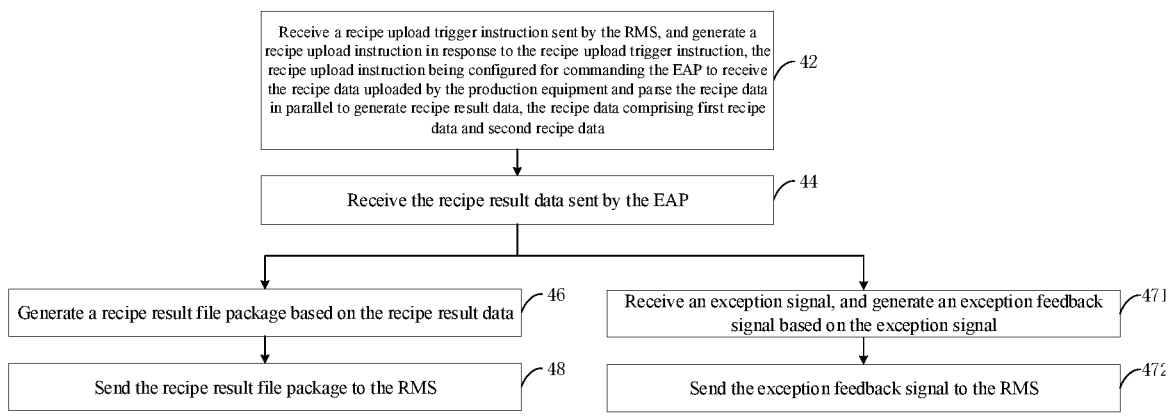
FIG. 7 is a schematic flow diagram of a control method for production equipment applied to a control system for production equipment according to another embodiment of the present disclosure.

Further, referring to FIG. 2 and FIG. 7, in one embodiment of the present disclosure, a control method for production equipment is provided. The control method may be applied to the control system 200 for production equipment as shown in FIG. 2, and the method also comprises following steps:

Step 471: receiving an exception signal, and generating an exception feedback signal based on the exception signal; and Step 472: sending the exception feedback signal to the RMS.

Figure 8:
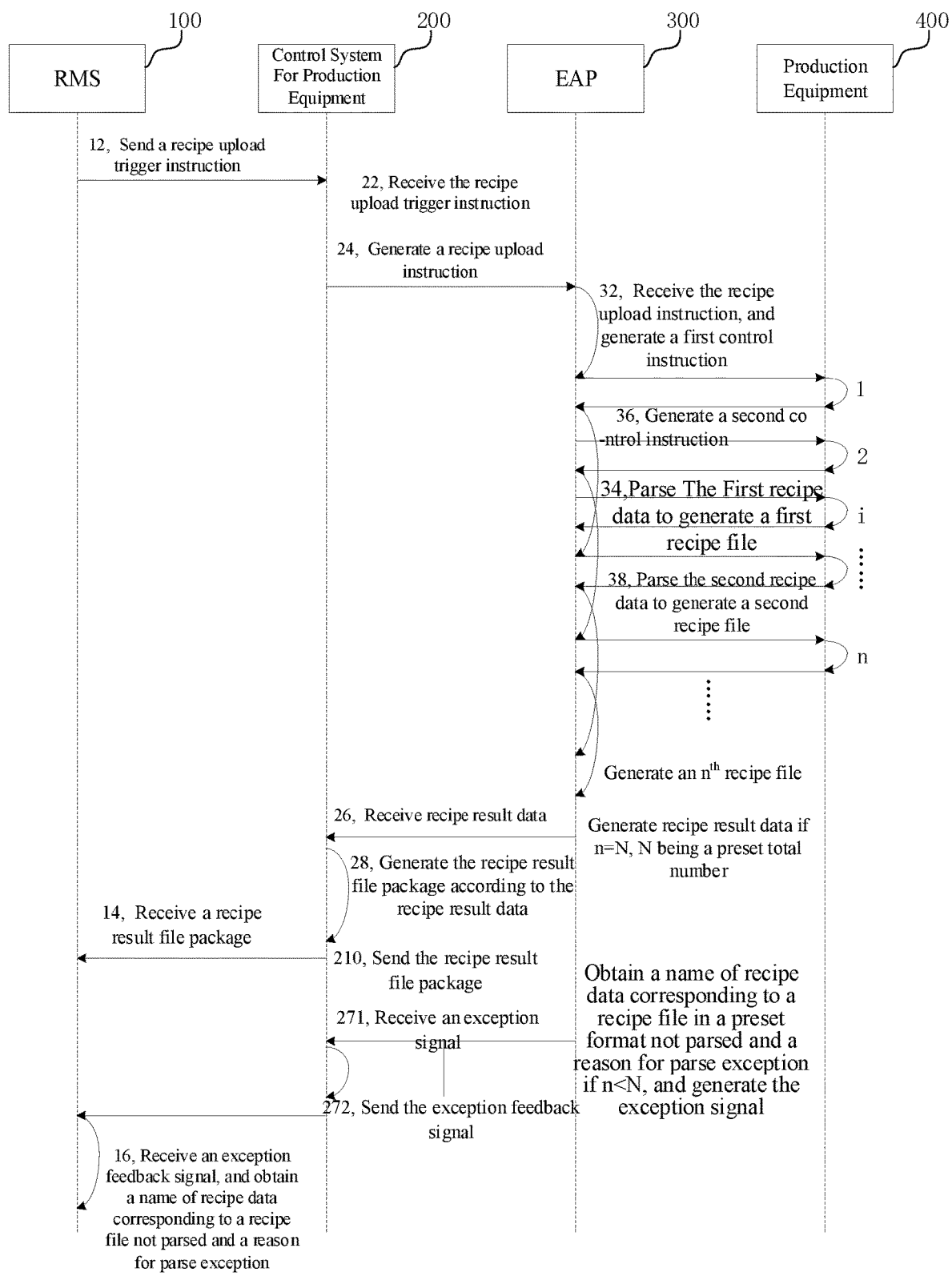
FIG. 8 is a schematic diagram of an application flow of a control method for production equipment according to still another embodiment of the present disclosure.

In some embodiments, referring to FIG. 7 and FIG. 8, the control system 200 for production equipment may receive an exception signal, generate an exception feedback signal based on the exception signal, and send the exception feedback signal to the RMS 100. In this way, it is convenient for a user to obtain the name of the recipe data corresponding to the recipe file in the preset format not parsed and the reason for parse exception by means of the RMS 100, such that efficiency and intelligence of the automatic control can be effectively improved.

As an example, in one embodiment of the present disclosure, the RMS is a semiconductor RMS, the EAP is a semiconductor EAP, and the production equipment is semiconductor production equipment. This embodiment effectively reduces the equipment idle time caused by sequential execution of control instructions by the semiconductor production equipment in the process of batch control of the semiconductor production equipment, and improves the production capacity of the semiconductor production equipment and the production efficiency of the automatic production line.

Further, referring to FIG. 8, in one embodiment of the present disclosure, a control method for production equipment is provided. The control method may be applied to the RMS 100 as shown in FIG. 8, and the method also comprises following steps:

Step 12: sending a recipe upload trigger instruction to cause a control system 200 for production equipment to receive the recipe upload trigger instruction and generate a recipe upload instruction based on the recipe upload trigger instruction, wherein the recipe upload instruction is configured for causing the EAP 300 to implement the control method for production equipment applied to the EAP as described in any embodiment of the present disclosure; and Step 14: receiving a recipe result file package.

In some embodiments, with continued reference to FIG. 8, the RMS 100 may send a recipe upload trigger instruction to cause the control system 200 for production equipment to receive the recipe upload trigger instruction and generate a recipe upload instruction based on the recipe upload trigger instruction. Thus, the EAP 300 may parse the second recipe data in parallel while parsing the first recipe data, such that time required for parsing the recipe data is shortened. In this way, equipment idle time caused by sequential execution of control instructions by the plurality of production equipment in the process of equipment batch control is effectively reduced. Furthermore, the RMS 100 may receive the recipe result file package, making it convenient for the user to obtain the recipe result file package, such that efficiency and intelligence of automatic control can be effectively improved.

Further, with continued reference to FIG. 8, in one embodiment of the present disclosure, a control method for production equipment is provided. The control method may be applied to the RMS 100 as shown in FIG. 8, and the method also comprises:

Step 16: receiving an exception feedback signal, and obtaining, based on the exception feedback signal, a name of recipe data corresponding to a recipe file in a preset format not parsed and a reason for parse exception.

In some embodiments, with continued reference to FIG. 8, the RMS 100 may receive an exception feedback signal, and obtain, based on the exception feedback signal, a name of recipe data corresponding to a recipe file in a preset format not parsed and a reason for parse exception, such that the user can directly obtain the name of the recipe data corresponding to the recipe file in the preset format not parsed and the reason for parse exception by means of the RMS 100. In this way, the efficiency and intelligence of the automatic control can be effectively improved.

As an example, in one embodiment of the present disclosure, the RMS is a semiconductor RMS, the control system for production equipment is a control system for semiconductor production equipment, the EAP is an EAP for semiconductor production, and the production equipment is semiconductor production equipment. This embodiment effectively reduces the equipment idle time caused by sequential execution of control instructions by the semiconductor production equipment in the process of batch control of the semiconductor production equipment, and improves the production capacity of the semiconductor production equipment and the production efficiency of the automatic production line.

It should be understood that although the steps in the flow diagrams of FIGS. 2-8 are shown sequentially as indicated by the arrows, these steps are not necessarily performed sequentially in the order indicated by the arrows. Unless expressly stated herein, the execution of these steps is not strictly limited in sequence, and these steps may be performed in other orders. Moreover, at least some of the steps in FIGS. 2-8 may include a plurality of sub-steps or a plurality o stages, which are not necessarily performed at the same moment, but may be executed at different moments, and the order of execution of these sub-steps or stages is not necessarily performed sequentially, but may be performed alternately or alternately with at least a portion of the sub-steps or stages of other steps or other steps.

Figure 9:
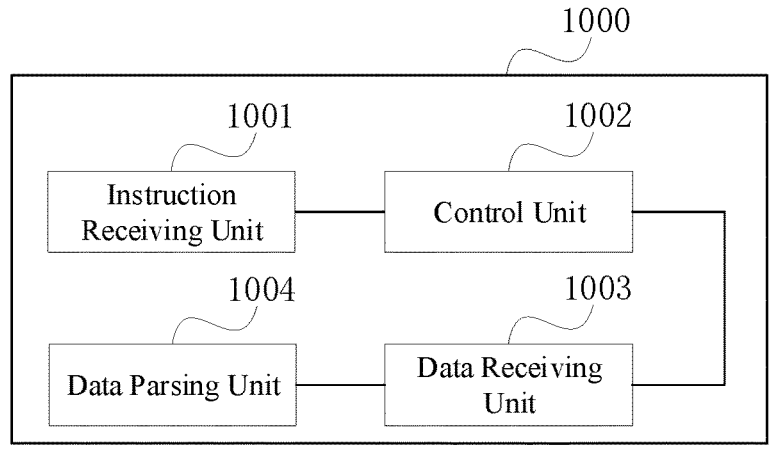
FIG. 9 is a structural block diagram of a control apparatus for production equipment according to an embodiment of the present disclosure.

Further, referring to FIG. 9, in one embodiment of the present disclosure, there is provided a control apparatus 1000 for production equipment. The control apparatus 1000 comprises an instruction receiving unit 1001, a control unit 1002, a data receiving unit 1003, and a data parsing unit 1004. The instruction receiving unit 1001 is configured to receive an recipe upload instruction. The control unit 1002 is connected to the instruction receiving unit 1001 and is configured to generate a first control instruction and a second control instruction in response to the recipe upload instruction received, wherein the first control instruction is configured for controlling the production equipment to upload first recipe data, and the second control instruction is configured for controlling the production equipment to upload second recipe data. The data receiving unit 1003 is connected to the control unit 1002 and is configured to receive the first recipe data and the second recipe data. The data parsing unit 1004 is connected to the data receiving unit 1003, and is configured to parse the first recipe data received to generate a corresponding first recipe file in a preset format. The data parsing unit 1004 is further configured to parse the second recipe data received to generate a corresponding second recipe file in a preset format. The data parsing unit 1004 parses the second recipe data in parallel while parsing the first recipe data, such that the time required for parsing the recipe data is shortened. In this way, equipment idle time caused by sequential execution of the control instructions by the plurality of production equipment in the process of equipment batch control is effectively reduced.

Reference may be made to limitations on the control method for production equipment for limitations on the control apparatus for production equipment, which are not repeated any more herein.

Modules in the above-mentioned control apparatus for production equipment may be implemented entirely or partly by means of software, hardware and combinations thereof. Each of the above modules may be embedded in the form of hardware or independent of a processor in a computer device, or may be stored in a memory of the computer device in the form of software, such that the processor can be invoked to execute the operations corresponding to each of the above-mentioned modules.

Figure 10:
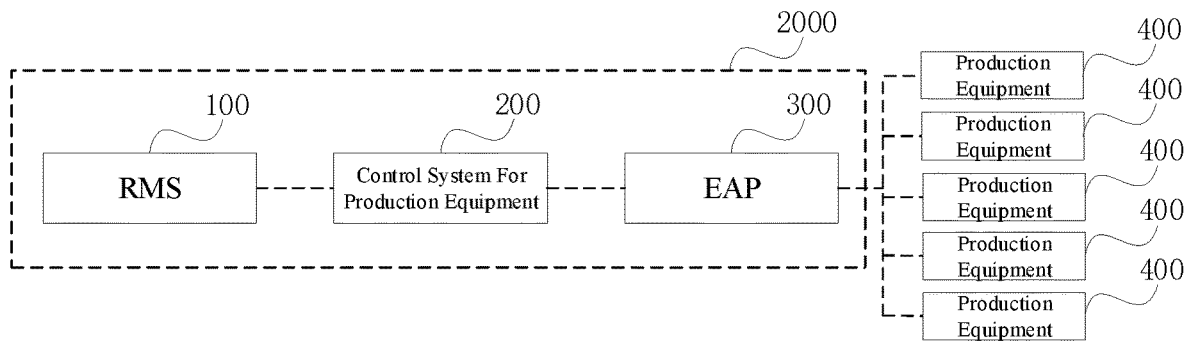
FIG. 10 is a structural block diagram of a control system for production equipment according to an embodiment of the present disclosure.

Further, referring to FIG. 10, in one embodiment of the present disclosure, there is provided a control system 2000 for production equipment. The control system 2000 comprises an equipment automation program (EAP) 300, a control system 200 for production equipment, and a recipe management system (RMS) 100. The EAP 300 is configured for implementing the control method for production equipment applied to the EAP as described in any embodiment of the present disclosure. The control method for production equipment applied to the control system 200 for production equipment as described in any embodiment of the present disclosure is applied to the control system 200 for production equipment. The control method for production equipment applied to the RMS 100 as described in any embodiment of the present disclosure is applied to the RMS 100. While parsing the first recipe data, the EAP 300 generates a second control instruction to control the production equipment 400 to upload the second recipe data, such that the EAP 300 parses the second recipe data received in parallel to generate a corresponding second recipe file in a preset format, thereby avoiding the delay caused by the EAP 300 in the process of parsing the first recipe data. Compared with the conventional EAP 300 that does not start parsing the second recipe data until parsing the first recipe data is completed, the EAP 300 provided in the present disclosure parses the second recipe data in parallel while parsing the first recipe data, such that time required for parsing the recipe data is shortened. In this way, equipment idle time caused by sequential execution of control instructions by the plurality of production equipment in the process of equipment batch control is effectively reduced, and the production capacity of the production equipment 400 and the production efficiency of the automatic production line are improved.

Figure 11:
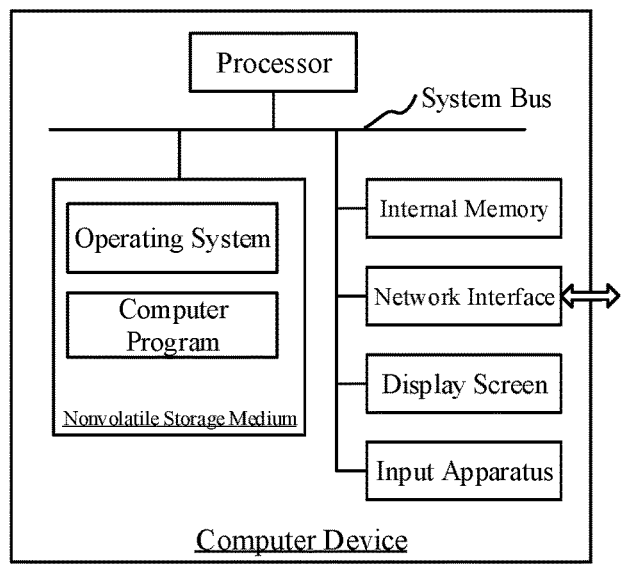
FIG. 11 is a schematic structural diagram of a computer device according to an embodiment of the present disclosure.

Further, referring to FIG. 11, in one embodiment of the present disclosure, there is provided a computer device, which comprises a memory and a processor. The memory has stored thereon a computer program runnable on the processor. The computer program is executable by the processor, whereby steps of the method described in any embodiment of the present disclosure are performed.

Further, in one embodiment of the present disclosure, there is provided a computer-readable storage medium having a computer program stored thereon. The computer program is executable by a processor, whereby steps of the method described in any embodiment of the present disclosure are performed.

In the computer device or the computer-readable storage medium provided in the above embodiment, the EAP is provided to parse the second recipe data in parallel while parsing the first recipe data, such that the time required for parsing the recipe data is shortened. In this way, equipment idle time caused by sequential execution of the control instructions by the plurality of production equipment in the process of equipment batch control is effectively reduced, and the production capacity of the production equipment and the production efficiency of the automatic production line are improved.

Those of ordinary skill in the art may understand that implementation of all or some flows in the method according to the foregoing embodiments may be achieved by instructing relevant hardware by a computer program, wherein the computer program may be stored in a non-transitory computer-readable storage medium, and when the computer program is executed, the flows of the embodiments of the foregoing methods may be included. Any reference to memory, storage, database or other media used in the embodiments provided in the present disclosure may include nonvolatile and/or volatile memory. The nonvolatile memory may include a read-only memory (ROM), a programmable ROM (PROM), an electrically programmable read-only memory ROM (EPROM), an electrically erasable programmable ROM (EEPROM) or a flash memory. The volatile memory may include a random access memory (RAM) or an external cache memory. As an illustration and not a limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchronization link (Synchlink) DRAM (SLDRAM), Rambus dynamic RAM (RDRAM), direct Rambus dynamic RAM (DRDRAM), and Rambus dynamic RAM (RDRAM), etc.

Technical features of the above embodiments may be arbitrarily combined. For simplicity, all possible combinations of the technical features in the above embodiments are not described. However, as long as the combination of these technical features is not contradictory, it shall be deemed to be within the scope recorded in this specification.

The above embodiments merely express a plurality of implementations of the present disclosure, and descriptions thereof are relatively concrete and detailed. However, these embodiments are not thus construed as limiting the patent scope of the present disclosure. It is to be pointed out that for persons of ordinary skill in the art, some modifications and improvements may be made under the premise of not departing from a conception of the present disclosure, which shall be regarded as falling within the scope of protection of the present disclosure. Thus, the scope of protection of the present disclosure shall be subject to the appended claims.

What is claimed is:

1. A control method for production equipment, comprising:
    receiving a recipe upload instruction, and generating a first control instruction in response to the recipe upload instruction to control the production equipment to upload first recipe data;
    receiving the first recipe data, and parsing of the first recipe data to generate a corresponding first recipe file in a preset format;
    generating a second control instruction during parsing of the first recipe data to control the production equipment to upload second recipe data; and
    receiving the second recipe data, and parsing of the second recipe data to generate a corresponding second recipe file in a preset format;
    wherein the recipe upload instruction comprises a preset total number of recipe data; after generating the corresponding second recipe file in the preset format, the method further comprises:
    obtaining a number of the recipe data received;
    determining whether a number of recipe files generated is equal to the preset total number when the number of the recipe data reaches the preset total number; and
    generating recipe result data if a determination result is YES.

2. The method according to claim 1, wherein the parsing of the first recipe data to generate a corresponding first recipe file in a preset format comprises:
    parsing the first recipe data by invoking a first thread to generate the corresponding first recipe file in the preset format.

3. The method according to claim 1, wherein the parsing of the second recipe data to generate a corresponding second recipe file in a preset format comprises:
    parsing the second recipe data by invoking a second thread to generate the corresponding second recipe file in the preset format.

4. The method according to claim 1, further comprising:
    obtaining a name of the recipe data corresponding to the recipe file in the preset format that is not parsed and a reason for a parse exception if the number of the recipe files generated is not equal to the preset total number; and
    generating an exception signal according to the name and the reason for the parse exception.

5. The method according to claim 1, wherein the production equipment is semiconductor production equipment, and the recipe data being semiconductor recipe data.

6. A method for controlling production equipment, comprising:
    sending a recipe upload trigger instruction to cause a control system for production equipment to receive the recipe upload trigger instruction and generate a recipe upload instruction based on the recipe upload trigger instruction; and
    receiving a recipe result file package;
    wherein the recipe upload instruction is configured for causing an equipment automation program to implement the control method for production equipment according to claim 1.

7. The method according to claim 6, further comprising:
    receiving an exception feedback signal, and obtaining, based on the exception feedback signal, a name of recipe data corresponding to a recipe file in a preset format that is not parsed and a reason for a parse exception.

8. The method according to claim 7, wherein the control system for production equipment being a control system for semiconductor production equipment, the equipment automation program being a semiconductor production equipment automation program, and the production equipment being semiconductor production equipment.

9. A non-transitory computer-readable storage medium having a computer program stored thereon, wherein the computer program is executable by a processor to perform the control method for the production equipment according to claim 1.

* * * * *